United States Patent [19]
Penny

[11] Patent Number: 5,502,715
[45] Date of Patent: Mar. 26, 1996

[54] INTEGRATED DIPLEXER-AMPLIFIER FOR NEAR ANTENNA INSTALLATION

[76] Inventor: James R. Penny, P.O. Box 4328, Fayetteville, Ark. 72702-4328

[21] Appl. No.: 406,015

[22] Filed: Mar. 16, 1995

[51] Int. Cl.$^6$ ............................. H04B 3/36; H04L 5/14
[52] U.S. Cl. .................. 370/26; 370/37; 370/38
[58] Field of Search ..................... 378/26, 35, 36, 378/38, 32, 24, 29, 30; 455/6.1, 19, 73, 80, 81, 83

[56] References Cited

U.S. PATENT DOCUMENTS

| | | | |
|---|---|---|---|
| 4,025,737 | 5/1977 | Brewer | 370/26 |
| 4,704,733 | 11/1987 | Kawano | 370/35 |
| 4,947,386 | 8/1990 | Preschutti | 370/26 |
| 5,258,728 | 11/1993 | Taniyoshi et al. | 370/38 |

*Primary Examiner*—Wellington Chin
*Attorney, Agent, or Firm*—Robert R. Keegan; Head, Johnson & Kachigian

[57] ABSTRACT

There is disclosed an integrated diplexer-amplifier for near antenna installation apparatus that routes amplified microwave signals in two different directions at the same time from RF input signals derived from two different sources. The apparatus makes use of four microwave bandpass filters arranged in a dual diplexer configuration and the amplifiers are connected such that RF signal gain in both directions is achieved, thereby eliminating the undesired losses associated with a coaxial cable such as that connected between a transceiving station and antenna. The apparatus is designed to be mounted on an antenna support, or a structure near to the antenna, in order to make up the RF signal loss of coaxial cable connections. Preferably the apparatus incorporates combline bandpass filters which pass essential fundamental signals only, providing high isolation between transmit and receive signals, while providing a grounded, connection to unwanted signals and DC current, thereby enhancing protection against lightning caused voltage damage. The apparatus permits the use of low cost, high loss, coaxial cable for connecting a transceiver system to an antenna.

16 Claims, 3 Drawing Sheets

INTEGRATED DIPLEXER-AMPLIFIER FOR NEAR ANTENNA INSTALLATION

BRIEF SUMMARY OF THE INVENTION

The present invention relates to amplifier-diplexer apparatus for near-antenna placement especially useful in microwave personal communications systems, cellular phone, and other communication systems. A typical prior art Microwave Personal Communications System (PCS) and Personal Communications Network System (PCN) (illustrated in FIG. 1 ) has transmitter and receiver sections separated by a common diplexer. In this manner a pair of bandpass filters conveys two distinct microwave signals to and from an antenna. The signals are commonly supplied to an antenna via a length of coaxial cable.

It is an object of the present invention to reduce the demand on the transmit amplifier power capability, thereby reducing the cost thereof, by eliminating expensive RF power amplifiers to overcome the loss of the usual coaxial cable or, the costly use of expensive, ultra low loss, coaxial cable. The receiver section of the typical cellular station also suffers from the losses caused by the coaxial cable, thereby preventing the effective use of low noise figure amplifiers which become degraded by coaxial cable loss.

This present invention employs conventional bandpass filters and amplifiers connected in a manner to form a hi-directional diplexer-amplifier of suitable bandwidths and frequency separation.

The most desirable configuration of the bandpass filters is that of a combline construction. Although both interdigital and lumped element filters can be connected as a diplexer, the third order output response may be undesirable. In most cases stripline filters would not be capable of providing a narrow enough channel bandwidth for the desired isolation. Lowpass filters and Highpass filter connected together for certain applications are viable as a substitute for bandpass filters.

This present invention may be configured with a combination of Dielectric Resonators, interdigital or combline bandpass filters, separately or mixed. The insertion loss of the diplexer nearest the antenna should have a low loss design, provide high isolation between the signals of at least 70 dB, and 85 dB isolation, or greater, would be preferable. Furthermore the diplexer portion nearest the antenna is preferable of a DC grounded structure so as to lend lightning protection to the apparatus.

BRIEF DESCRIPTION OF THE DRAWINGS

FIG. 1A is a graph of the typical power vs frequency isolation frequency of transmitter and receiver signal of 75 dB.

DETAILED DESCRIPTION

Figure 1:
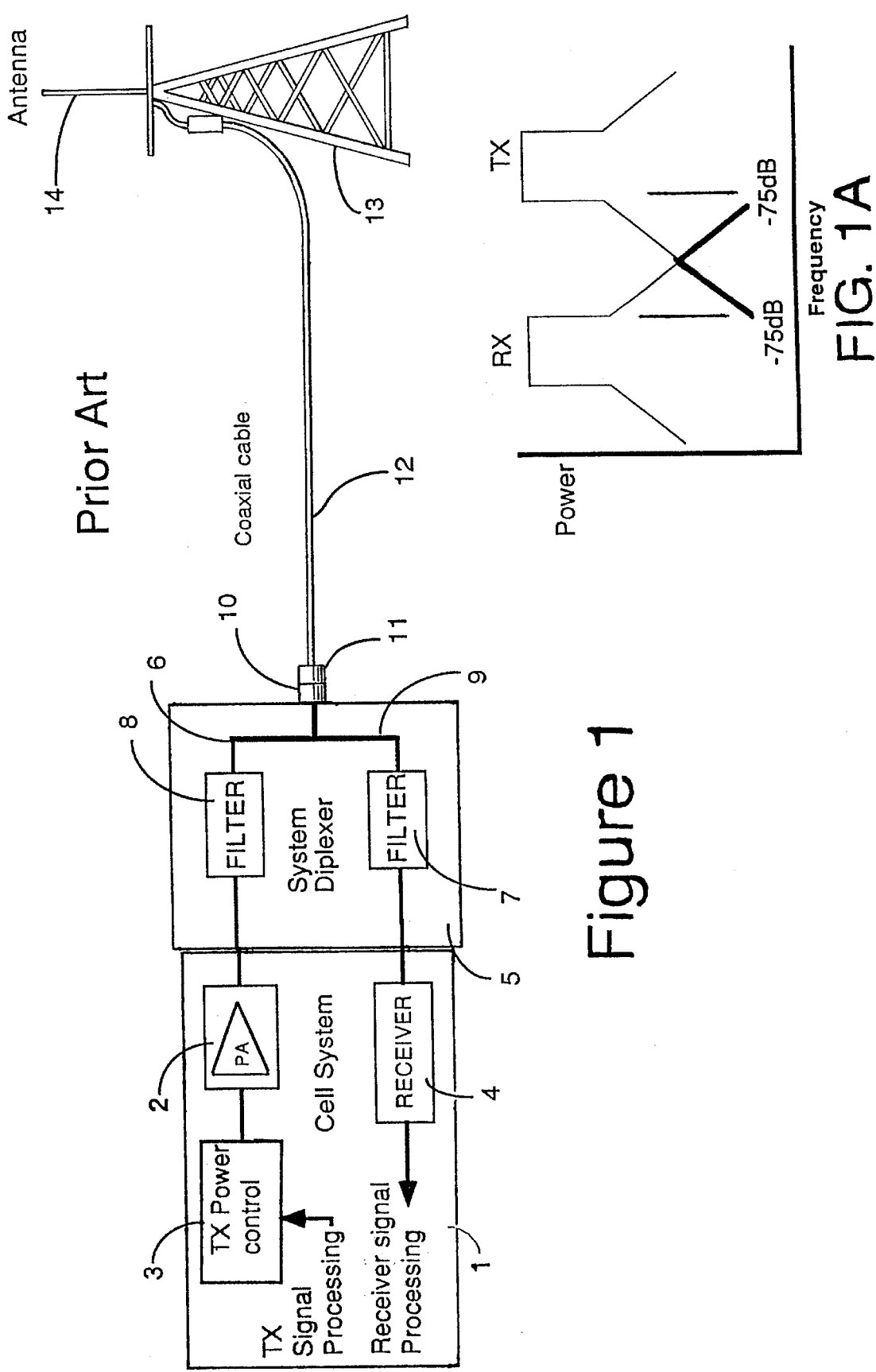
FIG. 1 depicts a typical radio frequency portion of a prior art 1.8 to 2.0 GHz PCS/PCN cellular radio system employed in the present communications art.

Referring now to the drawings, FIGS. 1, 1A, 2 and 3.

FIG. 1 depicts the typical radio frequency portion of a prior art 1.7 to 2.0 GHz PCS/PCN cellular radio system employed in the communications art. Enclosure 1 contains the Radio Frequency portion of a typical PCN/PCS radio receiver 4 and transmitter 2 with associated power control 3 which adjusts the amount of power sent to the antenna 14 to compensate for coaxial cable 12 loss and to maintain a suitable power level for desired communications coverage.

A diplexer unit 5 comprised of two filters 7, 8 joined at a common port connector 10 by internal connections 6 and 9 allows the two desired signals, receive and transmit, separated in frequency, to be connected to the antenna 14 mounted on tower 13 via connector 11 and coaxial cable 12.

FIG. 1A depicts the typical power vs frequency isolation of transmitter and receiver signal of (in this example 75 dB).

Figure 2:
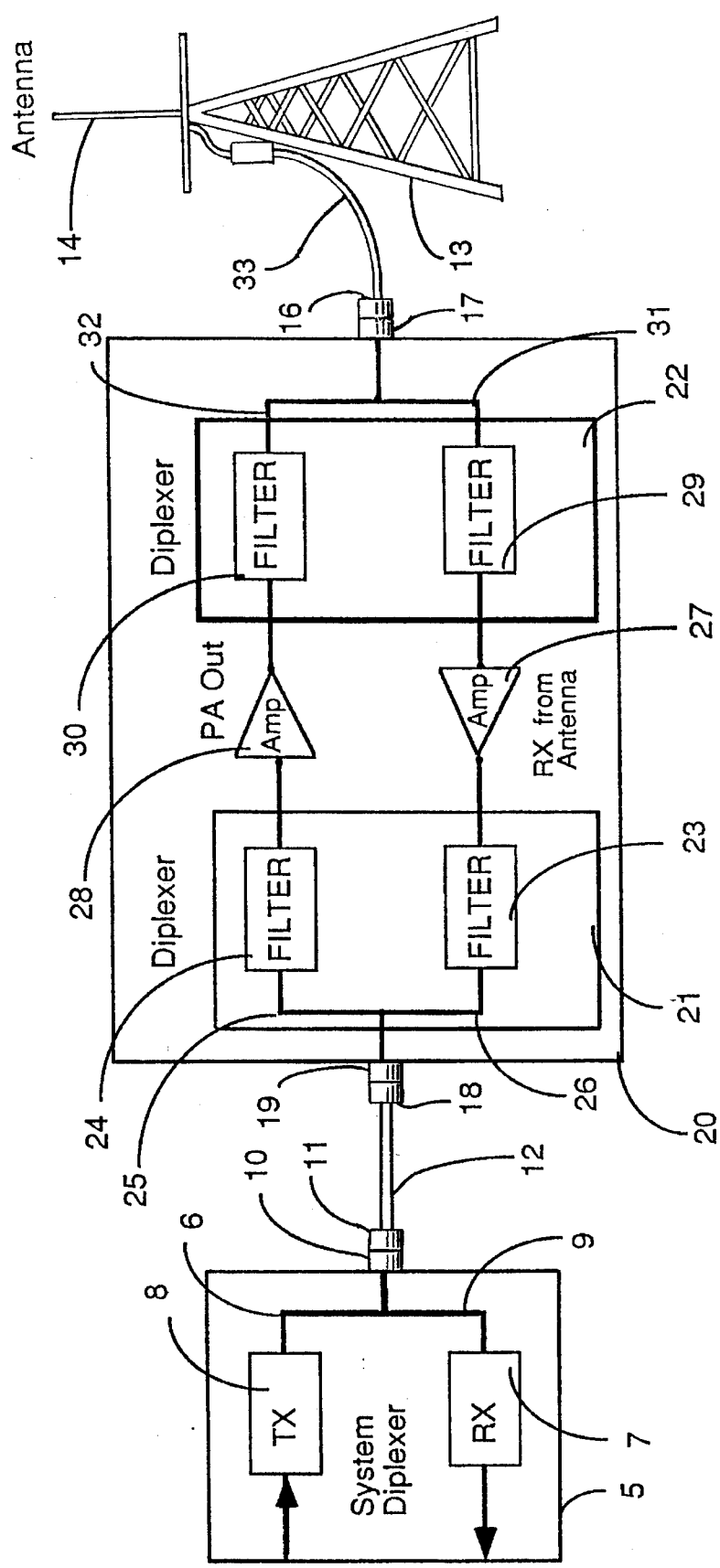
FIG. 2 depicts dual diplexer, dual amplifier apparatus according to the invention suitable for connection to a 1.7 to 2.0 GHz cellular site system implementing an object of the invention, to overcomes coaxial cable losses in the dual modes of transmit and receiving thereby improving signal strength in both communications paths.

A preferred embodiment of the present invention for reducing signal losses and coaxial cable costs shown in FIG. 2 depicts the apparatus according to the invention, as it would be connected to a 1.7 to 2.0 GHz cellular site system.

Enclosure 5 contains a diplexer of a typical PCN/PCS system comprised of two filters 7, 8 joined at common port coaxial connector 10 by internal connections 6 and 9 to allow the two desired signals, receive and transmit, separated in frequency and power levels, to be connected to the diplexer-amplifier enclosure 20 via coaxial cable 12 and coaxial connectors 18 and 19. The center conductor of coaxial connector 19 connects two filters 23, 24 joined together by connections 25, 26 comprising one half of the diplexer 21 of the present invention.

The transmit output signal from diplexer 24 becomes the RF power amplifier 28 input signal. The amplified signal is conducted to the second diplexer 30 joined to coaxial connector 17 via connection 32. The signal from coaxial connector 17 is conducted to coaxial connector 16 and via coaxial cable 33 to antenna 14 located on, or near the top of structure 13.

The received signal arriving to coaxial connector 16 via antenna 14, and coaxial cable 33 is coupled into enclosure 22 via coaxial connector 17 to junction connection 31 to filter 29 of diplexer 22. The output of filter 29 is amplified by amplifier 27 and supplied to filter 23 of diplexer 21. Connection 26 joins coaxial connector 19 to coaxial connector 18 which is joined to coaxial cable 12, and via coaxial connectors 11 and 10 thereupon enters the system diplexer enclosure 5 and passes through bandpass filter 7 for signal processing.

Figure 3:
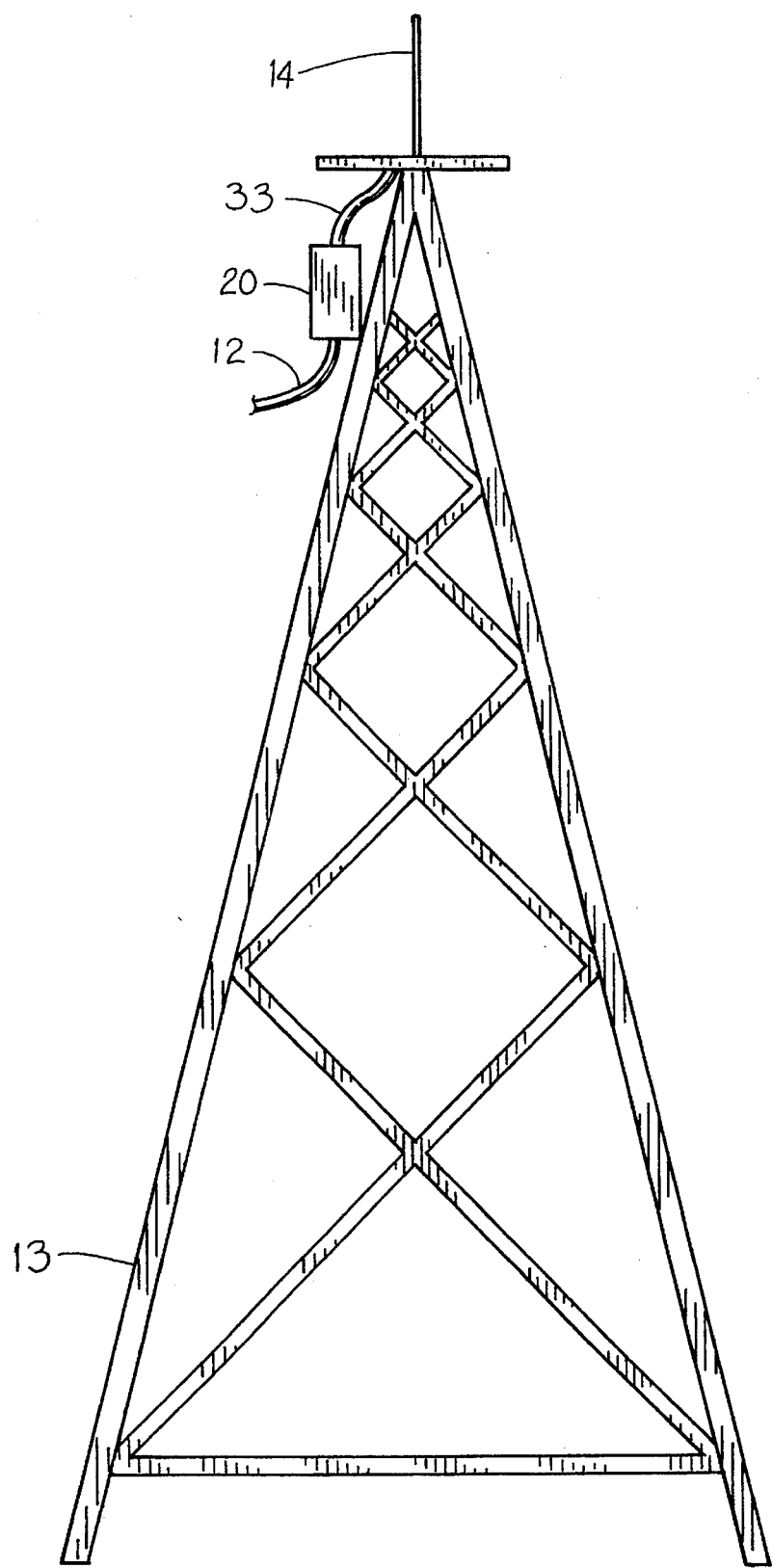
FIG. 3 depicts a generalized view of the apparatus placement on a tower, usually supporting the antenna.

FIG. 3 is a generalized view of the apparatus 20 placement on a tower 13 as might be employed to support the antenna 14.

The bibliography reference specification sheets of Penny Technologies or Loral show filter configurations useful in a preferred method of containing the dual filters in one metallic, or metalized plastic structure, either molded or extruded for simplicity and ease of construction. Connectors need not be used in cases where a direct wired connection to and from the amplifiers is employed.

Although it is believed that the operation of the apparatus according to the invention is apparent from the previous description, the overall operation may be generally described as follows. The integrated diplexer-amplifier 20 which is preferably a unitary metallic or metallicized plastic structure sealed to form a weather tight enclosure is provided with a transmitter receiver connector 19 and an antenna connector 17. Bi-directional signals of separate and distinct frequencies propagate in cable 12 connected to transmitter receiver connector 19 and the diplexer 21 causes the signals to be separated so that the transmit signal passes through and is amplified by amplifier 28 whereas the receive signal propagating in the other direction is transmitted and amplified by amplifier 27. Following diplexer 22 the transmit signal and the receive signal paths are again joined at antenna connector 17. Thus, while there is a common signal path for the transmit and receive signals both in short cable 33 connected to the antenna and in longer cable 12 connected to the transmit receive diplexer 5, the bidirectional diplexer-amplifier 20 serves to impart substantial gain for each of the transmit and receive signals propagating in opposite directions, such gain typically being on the order of 20 dB.

This provides the advantage of permitting the relatively long transmission line 12 to be an inexpensive rather lossy coaxial cable while not requiring very expensive transmitters or receivers in the cell system transmitter receiver unit, and still other advantages accrue as described above.

Although the operation of the integrated diplexer-amplifier appears to be simple and straightforward, the structure of the apparatus has a characteristic which is very unusual and believed to be unique for communication systems. It will be noted from FIG. 2 that, because the transmit signal path and the receive signal path are joined at both ends of the apparatus there is an internal loop path in which there are relatively high gain amplifiers that would cause the loop gain in the absence of the filters of the diplexers to be in excess of 20 dB and typically much greater. Such regenerative amplification is normally avoided by whatever means is necessary and even loop signal paths due to unwanted capacitive of coupling or other phenomenon are carefully designed out of systems.

In the present invention however, such a loop signal path has been found to be very advantageous and deleterious effects of such paths have been fully overcome by the use of the multiple diplexers which in effect assure that neither the transmit frequency nor the receive frequency nor any frequencies of relevance escape the high attenuation provided by the filters at some points in the loop containing receive amplifier 27 and transmit amplifier 28.

The values of the parameters for the integrated diplexer-amplifier according to the invention are subject to wide variation. By way of example, a prototype as described may have a transmit frequency of 1950–1970 MHz, and a receive frequency of 1870–1890 MHz. The mutual isolation of the filters between the transmit and receive frequencies may be approximately 75 dB, the gain of each of the amplifiers 27 and 28 may be 24 dB, the insertion loss of each of the filters 23, 24, 29 and 30 is less than 1 dB. The power which is preferably supplied to the amplifiers in the form of DC supplied through cable 12 is approximately 5 watts and the design RF input power to transmit amplifier 28 is typically 5–10 milliwatts.

In the event that one chose to provide separate transmit and receive paths from the diplexer-amplifier to separate transmit and receive antennas on a common tower then there could be indirect coupling between the transmit and receive antenna for the transmit and receive signal paths rather than the direct coupling within the diplexer-amplifier as shown in FIG. 2. Otherwise the operation of the integrated diplexer-amplifier would be similar and effective for such a configuration.

Information regarding known conventional components used in tower mounted devices using multiplex techniques may be found in more detail in the references publications and patents listed in the Bibliography below.

From the foregoing explanation and description, it will be understood the apparatus according to the invention provides a novel means of constructing an amplifier and diplexer arrangement that provides superior performance to that of a ground located apparatus remote from the antenna in terms of RF power saving while increasing the total system performance with less expensive coaxial cable and power amplifiers.

It may be noted that specific voltages and currents and the means to connect them as described in the application as well as the RF power requirement are exemplary only due to the fact that these variables are determined by the various system users and communications coverage required. Many variations and modifications with respect to the apparatus of the invention shown, described or suggested will be apparent to those of skill in the art and, accordingly the scope of the invention is not to be considered limited to the particular embodiments shown, described or suggested, but is rather to be determined by reference to the appended claims.

Appendix/Bibliography

U.S. PATENT DOCUMENTS

| 3,818,389 | 06/1974 | Fisher |
| 4,091,344 | 05/1978 | LaTourrette. |
| 4,578,656 | 03/1986 | Lacour et al. |
| 5,023,579 | 06/1991 | Bentivenga et al. |
| 5,066,933 | 11/1991 | Komeda |

OTHER PUBLICATIONS

E.G. Cristal, Capacity coupling Shortens Combline Filters. Microwaves Dec. 1967 (Pages 44 to 50).

G. L. Mattaei and E.G. Cristal, Theory & Design of Diplexer & Multiplexers; Advances in Microwaves, 1967 (pages 237 to 326) Published by Academic Press.

Alan Conrad, "Software Sorts Dielectric-Filter Requirements", Microwaves & RF, April 1994; P. 209.

Celwave Catalog, #195 Tower Mounter Cellular Receiver Multicouplers, model no. RMC836-16K, page No. 226

Loral Microwave/Narda Cellular, SMR & PCS Components, Networks, and Instruments Catalog, Tower Mounted Receiver Preselectors, Page No. 6.

Penny Technologies, Brooklyn, N.Y. 11222, Spec. sheet, "Model 1C950RP Dual G5M Filter for 902.5 MHz Fo & 947.5 MHz Fo", Apr. 6, 1994, page 1 of 1.

Loral Microwave Narda West, 11040 White Rock Road, Bldg. 200, Rancho Cordova, Calif. 95670-6001, Spec. sheet, "Cellular Duplexers, Standard Series", undated, pages 1–2 of 2.

What is claimed is:

1. An integrated microwave assembly comprised of a predetermined number of bandpass filters connected to a predetermined number of RF amplifiers with signal flow in two different directions with amplification, and RF power output as required, to overcome signal losses associated with coaxial cable or other connections to an antenna system, and where such an integrated assembly is intended to mount directly to a tower, near to an antenna and particularly adapted to surviving the weather elements and some lightning effects, and where the beneficial use of the invention is for microwave communications, especially useful to microwave cellular telephone systems, personal (PCS) communications systems and personal (PCN) communications networks in the 800 MHz to 5 GHz and where the physical placement of the bandpass filters is located within dual metallic, or, metallic coated waveguide extrusion, or, molding having minimal, or, seamless construction and said assembly composed of:

a first combline bandpass filter having a waveguide configuration and including a plurality of high Q resonators;

a second combline bandpass filter having a waveguide configuration and including a plurality of high Q resonators;

said first and second bandpass filters being electrically connected at one end, inside the waveguide cavity, forming a common connector port therefore being adapted to accommodate two frequency spectrums at the same time with insertion losses of less than one dB in each bandpass filter;

the center frequency of said first bandpass filter approximately that of a transmission source; the center frequency of the second bandpass filter approximately that of the receiving source;

an input of an amplifier for transmitting is placed at the output port of bandpass filter one;

an output of an amplifier for receiving is connected to the second bandpass filter where the increased RF signal level is conducted to the common port of the two bandpass filters for ultimate conduction to a radio system for signal processing;

a third combline bandpass filter having a waveguide configuration and including a plurality of high Q resonators;

a fourth bandpass combline filter having a waveguide configuration and including a plurality of high Q resonators;

said third and fourth bandpass filters being electrically connected to a common port; the center frequency of said third bandpass filter is approximately that of the transmission source; the center frequency of the fourth bandpass filter approximates that of the desired receiving frequency;

the output of the transmitting RF power amplifier four is connected to bandpass filter three, adjusted as above, for the desired transmitting frequency; and, the input signal port of the receiving amplifier is connected to the output port of bandpass filter four, above designated as the receiving filter; the received signal, now amplified, is conducted to the input port of the second bandpass filter for conduction, via the common bandpass filter connection, to the remotely located, coaxial cable connected, radio system.

2. An integrated bandpass filter amplifier assembly as defined in claim 1, wherein the means of separating the dual signal paths comprises a full duplexed signal arrangement wherein the elements thereof share a common weather protected enclosure suitable for mounting on a tower, or other suitable structure near to the antenna and the actual multiple bandpass filter is contained within a single housing with dual aparatures.

3. An integrated bandpass filter amplifier assembly as defined in claim 2, further comprising an embodiment of the filter structures that the common ports are at DC ground potential, preferably connected to earth ground, to reduce the potential damaging effects of nearby lightening strikes.

4. An integrated bandpass amplifier assembly as defined in claim 3, for obtaining a signal advantage by being located close to an antenna without the losses associated with long distance lengths of coaxial cable.

5. An integrated bandpass filter amplifier assembly as defined in claim 4, with an RF power amplifier supplying the significant RF signal to the antenna for radiation thereby reducing the systems requirement to supply supplemental RF power to compensate for predictable coaxial cable loss.

6. An integrated bandpass filter amplifier assembly as defined in claim 5, with a receiving RF amplifier, preferably with low noise figure, said amplifier having enough power gain to overcome associated coaxial cable losses while sending the amplified received signal to the associated receiving system processing.

7. An integrated bandpass filter amplifier assembly as defined in claim 6, permits the use of low cost RF power amplifiers for transmitting, thereby improving the efficiency of a system for a required RF power requirement at the antenna for a desired communications coverage.

8. An integrated bandpass filter amplifier assembly as defined in claim 7, allows the use of low performance coaxial cable for a given length requirement, thereby further enhancing the cost efficiency for a given system.

9. An integrated bandpass filter amplifier assembly as defined in claim 8, comprising at least 75 dBc of isolation between receiving and transmitting frequencies at the bandpass filters common ports.

10. An integrated diplexer-amplifier for near antenna installation adapted to receive an input from and provide an output to a microwave transmission line connected to a microwave communications transmitter-receiver and also connected by a short signal transmission line to a transmit and receive antenna unit or other utilization device so that low noise amplification is provided for bi-directional signals, comprising:

a first transmit frequency combline filter having an input and an output and a waveguide configuration including a plurality of high Q resonators;

a first receive frequency combline filter having an input and an output and a waveguide configuration including a plurality of high Q resonators, said first transmit frequency combline filter input being electrically connected to said first receive frequency combline filter output at a common connector port for said diplexer-amplifier;

a transmit signal amplifier having an input and an output with said input connected to said first transmit frequency combline filter output;

a receive signal amplifier having an input and an output with said output connected to said first receive frequency combline filter input;

a second transmit frequency combline filter having an input and an output and a waveguide configuration including a plurality of high Q resonators with said input connected to said transmit signal amplifier output;

a second receive frequency combline filter having an input and an output and a waveguide configuration including a plurality of high Q resonators with said output connected to said receive signal amplifier input; and said second transmit frequency combline filter output being electrically coupled to said second receive frequency combline filter input, a signal transmission line having a first end electrically connected to said output of said second transmit frequency combline filter and said input of said second receive frequency combline filter, said signal transmission line other end being connectable to an antenna unit.

11. An integrated diplexer-amplifier as recited in claim 10 wherein each of said combline filters has at least six resonators and there is at least 70 dB of isolation between receive frequency and transmit frequency at said combline filters common ports.

12. An integrated diplexer-amplifier as recited in claim 11 wherein the gain of each of said amplifiers is greater than 10 dB.

13. An integrated diplexer-amplifier for near antenna installation adapted to receive an input from and provide an output to a microwave transmission line connected to a microwave communications transmitter-receiver and also connected by a short signal transmission line to a transmit and receive antenna unit or other utilization device so that low noise amplification is provided for bi-directional signals, comprising:
 a first transmit frequency filter having an input and an output and including a plurality of high Q resonators;
 a first receive frequency filter having an input and an output and including a plurality of high Q resonators, said first transmit frequency filter input being electrically connected to said first receive frequency filter output at a common connector port for said diplexer-amplifier;
 a transmit signal amplifier having an input and an output with said input connected to said first transmit frequency filter output;
 a receive signal amplifier having an input and an output with said output connected to said first receive frequency filter input;
 a second transmit frequency filter having an input and an output and including a plurality of high Q resonators with said input connected to said transmit signal amplifier output;
 a second receive frequency filter having an input and an output and including a plurality of high Q resonators with said output connected to said receive signal amplifier input; and
 said second transmit frequency filter output being electrically coupled to said second receive frequency filter input, a signal transmission line having a first end electrically connected to said output of said second transmit frequency filter and said input of said second receive frequency filter, said signal transmission line other end being connectable to an antenna unit.

14. An integrated diplexer-amplifier as recited in claim 13 wherein each of said filters has at least six resonators and there is at least 70 dB of isolation between receive frequency and transmit frequency at said combline filters common ports.

15. An integrated diplexer-amplifier as recited in claim 14 wherein the gain of each of said amplifiers is greater than 10 dB.

16. An integrated diplexer-amplifier as recited in claim 13 wherein the gain of each of said amplifiers is greater than 10 dB.

* * * * *